United States Patent

[11] 3,628,749

| [72] | Inventors | Wolfgang Ort<br>Bad Cannstatt;<br>Gerhard Brauning, Ruit, both of Germany |
|---|---|---|
| [21] | Appl. No. | 875,813 |
| [22] | Filed | Nov. 12, 1969 |
| [45] | Patented | Dec. 21, 1971 |
| [73] | Assignee | Eastman Kodak Company<br>Rochester, N.Y. |
| [32] | Priority | Dec. 12, 1968 |
| [33] | | Germany |
| [31] | | P 18 14 222.8 |

[54] AUTOMATIC FILM THREADING DEVICE
5 Claims, 1 Drawing Fig.

[52] U.S. Cl. ........................................... 242/186,
242/188, 242/192, 242/197
[51] Int. Cl. .......................................... G11b 15/66,
G11b 15/26
[50] Field of Search .......................................... 242/192,
195, 108, 186, 189, 190, 197, 198, 199, 200, 207;
352/157, 158

[56] References Cited
UNITED STATES PATENTS

| 2,891,736 | 6/1959 | Blaes ........................... | 242/192 |
| 3,497,157 | 2/1970 | Hanes et al. .................. | 242/188 |

*Primary Examiner*—George F. Mautz
*Attorneys*—Robert W. Hampton and G. Herman Childress

ABSTRACT: A film-threading device for a cinematographic projector and/or camera comprises a friction or drive wheel adapted to be placed in engagement with the outer convolution of a roll of film or the like. The film roll may be positioned within a cartridge on a projector and/or camera or the film roll may be unenclosed. A pressure bar is also movable into engagement with the film roll. The bar has a mirror surface. A light source directs a light beam against the mirror surface and then to a photocell. In operation the film roll is first rotated in a takeup direction and, as the leading end of the film passes the pressure bar, it breaks the light beam to the photocell. This effects a switching operation which causes the drive wheel to be driven in a direction for feeding the leading end of the film from the roll to a self-threading mechanism of the projector, camera or the like.

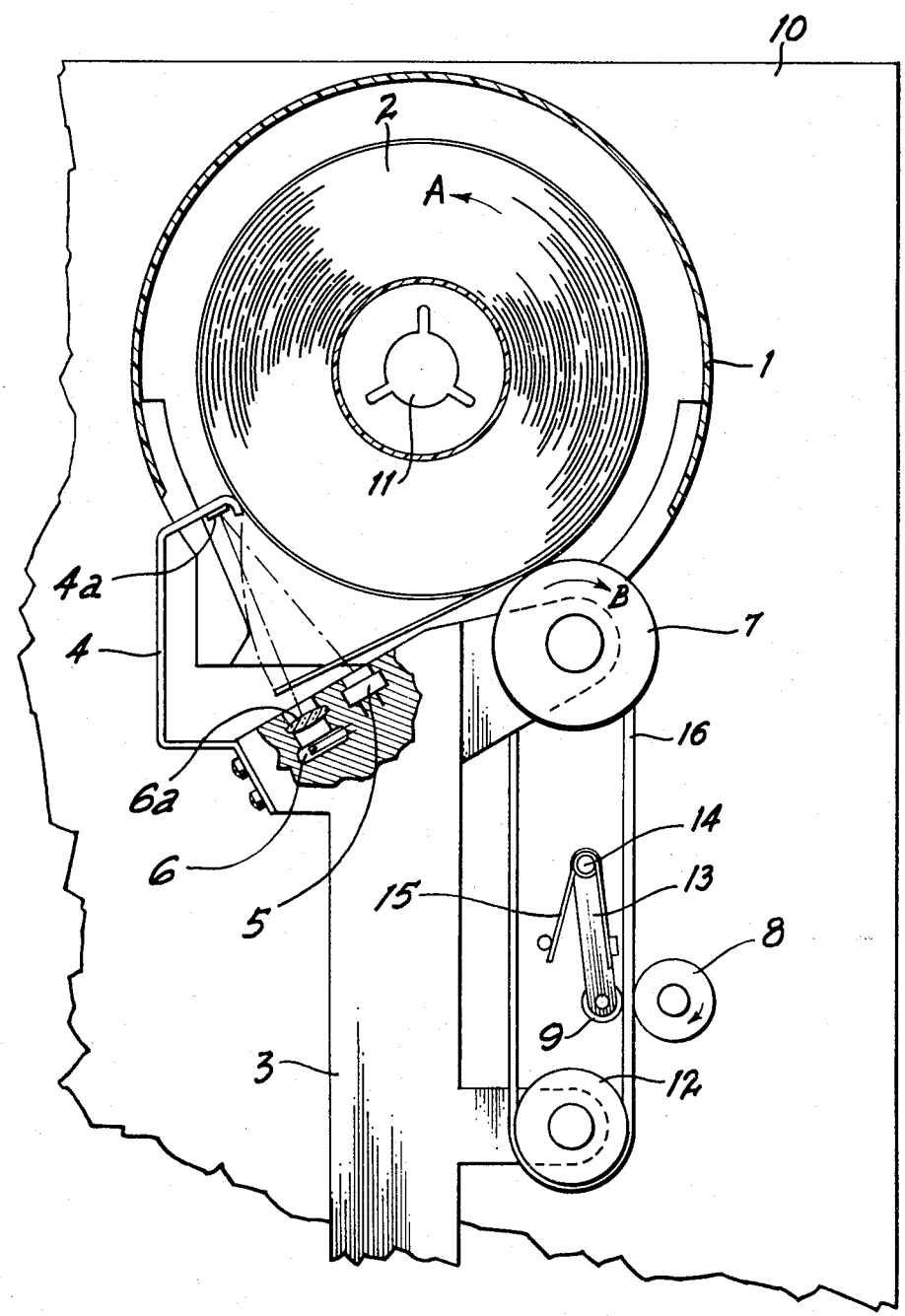
GERHARD BRAUNING
WOLFGANG ORT
INVENTORS

3,628,749

AUTOMATIC FILM THREADING DEVICE

BACKGROUND OF THE INVENTION

1. Field of the Invention

This invention relates to an automatic film feeding or threading device for cinematographic cameras and/or projectors which are adapted for use of film spools and/or cartridges, the free end of the film strip being captured and directed to a film-guiding device by means of a friction wheel acting on the film winding.

2. Description of the Prior Art

Automatic film-threading devices on projectors are known per se. There are certain types for projectors which are adapted for spools or cartridges. In such a device for a cartridge-loading projector according to U.S. Pat. No. 3,429,518, issued Feb. 25, 1969 in the name of E. S. McKee, a transport member swings into a cartridge slot and a film separator simultaneously separates the free end of the film strip from the winding and this free end of the film is moved out of the cartridge to a film-guiding device by a friction wheel or friction belt (belt drive) of the transport member. The swinging range of this device is limited, however, so that only cartridges of a definite size range can be used. Moreover, this device is not adapted for spools without cartridges. Other solutions are known from DBGM No. 1,913,548 and Austrian Pat. No. 271,200.

SUMMARY OF THE INVENTION

It is an object of the present invention to provide a film-threading device which substantially eliminates the existing disadvantages and thus permits the use of spools and/or cartridges of widely different sizes.

In accordance with a preferred embodiment of the invention, means are provided for separating the loose end of the film strip from the winding during its initial revolution(s) in a takeup direction, sensing said end of the film strip and, in response to such sensing, effecting reversal of the direction of revolution of the winding at a predetermined time by driving the winding in an unwinding direction with a friction wheel.

In the illustrated embodiment of the invention, the means for separating, sensing and moving the end of the film strip out of the magazine are successively located in a takeup direction (with respect to the winding). The end of the film strip separating from the winding is sensed by influencing photoelectric means of a known type and, in response to such sensing, a switching mechanism for the drive of the friction wheel is activated.

The force for driving the film winding in takeup direction preferably acts through an easily responding slip clutch that responds instantly when the end of the film strip has been sensed and the transport means are activated. Then the slip clutch operates as a brake and prevents the winding from clock-springing.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, which illustrate a side view of the device with a cartridge in its operating position.

DESCRIPTION OF THE PREFERRED EMBODIMENTS

Because photographic apparatus is well known, the present description will be directed in particular to elements forming part of, or cooperating more directly with, the present invention, apparatus elements not specifically shown or described herein being understood to be selectable from those known in the art.

In suitable recesses of a mechanism plate 10, a cartridge 1 is held in position by latching means (not shown). A film spool 2 is driven in a film takeup direction, designated by arrow A, by drive means (not shown) via a spool or spindle shaft 11 and a slip clutch. A member 3 is movable (in part) into and out of the cartridge 1 through an opening in the bottom of the cartridge. Member 3 supports a rotatable pulley 12 and a friction or drive wheel 7. Both pulley 12 and wheel 7 are coupled together by a drive belt 16. The belt 16 is driven by means of a roller 8 located within the range of movement of member 3 and adjacent one side of one reach of the belt. A pressure roller 9 supported on lever 13 and movable with the lever about pivot 14, is urged toward roller 8 and against the other side of such one reach of the belt by means of a spring 15 to produce the friction required for roller 8 to drive the belt.

A film pressure bar 4 is secured to the member 3 and has a mirror surface 4a. A photoelectric sensing device comprising a light source 6, a condenser lens 6a and a photocell 5 is show in the area of member 3 that is broken away. The bar 4 is movable into the cartridge through the opening in the bottom thereof for engaging the film roll.

In operation, a loaded cartridge 1 is fixed to spool shaft 11, and the projector is switched on. Member 3 is moved into the cartridge and spool 2 is slowly driven in takeup direction as shown by arrow A. The film pressure bar 4 presses lightly against the film winding. As a result of friction by the film winding, the friction wheel 7 is first driven in the direction indicated by arrow B. Light source 6 is energized and, via mirror 4a, emits a light beam focused by lens 6a onto the photocell 5 which thus has a certain static current.

As soon as the loose or leading end of the film strip passes the pressure bar 4, it separates from the winding and, for a moment, interrupts the path of light rays of the sensing device. This short alteration of the current in the photocell 5 corresponds to an electric pulse which influences a switching device (not shown), such as an electronic switching device, which switches the drive mechanism for roller 8 to drive roller 8 in a direction designated C. This causes the friction wheel 7 to be driven opposite to the direction shown at B and, since the spool shaft 11 is rotated in direction A by means of an easily responding slip clutch, the direction of revolution of the spool is reversed, too. This causes the end of the film strip to be driven out of the cartridge before it travels in direction A far enough to pass the friction wheel 7 and to be directed to a film-guiding mechanism (not shown).

The invention has been described in detail with particular reference to a preferred embodiment thereof, but it will be understood that variations and modifications can be effected within the spirit and scope of the invention.

We claim:

1. An automatic film-threading mechanism for removing the leading end portion from a spool of web material or the like comprising:
    a drive member for rotating the film roll in an unwinding direction,
    means mounting said drive member for movement into and out of engagement with the film roll,
    means for driving said drive member in a direction for effecting movement of the spool in an unwinding direction,
    means for initially driving the spool in a direction for taking up strip material onto the spool,
    means for sensing the presence of the leading end of the web material at a particular position relative to said drive member when the spool is being driven in a takeup direction, and
    means coupled to said sensing means and to said means for driving said drive member for initiating driving said drive member in a direction to cause movement of the spool in an unwinding direction.

2. An automatic film-threading mechanism for removing the leading end portion from a spool of web material or the like comprising:
    a drive member for rotating the film roll in an unwinding direction,
    means mounting said drive member for movement into and out of engagement with the film roll, means for driving said drive member in a direction for effecting movement of the spool in an unwinding direction, means for initially driving the spool in a direction for taking up strip material onto the spool, means for sensing the presence of the leading end of the web material at a particular position relative to said drive member when the spool is being driven in a takeup direction, means coupled to said sensing means and to said means for driving said drive member for driving said drive member in a direction to cause movement of the spool in an unwinding direction, and means for separating the leading end of the web material from the spool during its rotation in the takeup direction.

3. An automatic film-threading mechanism as set forth in claim 2 wherein the separating means, sensing means and drive member are arranged relative to the spool so that the leading end of the web material successively passes the separating means, sensing means and drive member when the spool is driven in the takeup direction.

4. An automatic film-threading mechanism for removing the leading end portion from a spool of web material or the like comprising:

a drive member for rotating the film roll in an unwinding direction, means mounting said drive member for movement into and out of engagement with the film roll, means for driving said drive member in a direction for effecting movement of the spool in an unwinding direction, means for initially driving the spool in a direction for taking up the strip material onto the spool, means for sensing the presence of the leading end of the web material at a particular position relative to said drive member when the spool is being driven in a takeup direction, said sensing means comprising a photosensitive member and a light source for directing a light beam toward said photosensitive member, and means coupled to said sensing means and to said means for driving said drive member for driving said drive member in a direction to cause movement of the spool in an unwinding direction.

5. An automatic film-threading mechanism as set forth in claim 4 further comprising an arm for engaging the spool and for effecting rapid separation of the leading end of the web material as the leading end passes the arm, and a light-reflective surface on said arm for deflecting the light beam from the light to the photosensitive member so that the leading end of the material interrupts the light as it passes from the arm.

* * * * *